(12) United States Patent
Liao

(10) Patent No.: US 8,728,639 B2
(45) Date of Patent: *May 20, 2014

(54) BATTERY WITH CHLOROPHYLL ELECTRODE

(75) Inventor: Chungpin Liao, Taichung (TW)

(73) Assignee: iNNOT BioEnergy Holding Co., George Town (KY)

( * ) Notice: Subject to any disclaimer, the term of this patent is extended or adjusted under 35 U.S.C. 154(b) by 428 days.

This patent is subject to a terminal disclaimer.

(21) Appl. No.: 13/076,210

(22) Filed: Mar. 30, 2011

(65) Prior Publication Data

US 2012/0148891 A1 Jun. 14, 2012

(30) Foreign Application Priority Data

Dec. 13, 2010 (CN) .......................... 2010 1 0585553

(51) Int. Cl.
*H01M 8/16* (2006.01)

(52) U.S. Cl.
USPC ............................. 429/2; 429/218.1; 429/212

(58) Field of Classification Search
USPC .......................................... 429/2, 218.1, 212
See application file for complete search history.

(56) References Cited

U.S. PATENT DOCUMENTS

| | | | |
|---|---|---|---|
| 4,251,607 A * | 2/1981 | Yamaki et al. ................ | 429/338 |
| 4,550,067 A * | 10/1985 | Horiba et al. ................ | 429/213 |
| 5,928,714 A * | 7/1999 | Nunome et al. ........... | 427/126.3 |
| 6,096,453 A * | 8/2000 | Grunwald ..................... | 429/212 |
| 6,511,774 B1 | 1/2003 | Tsukuda et al. | |
| 6,905,798 B2 | 6/2005 | Tsukuda et al. | |
| 7,405,172 B2 | 7/2008 | Shigematsu et al. | |
| 8,445,132 B2 * | 5/2013 | Liao ............................. | 429/164 |
| 2008/0254359 A1 * | 10/2008 | Byun et al. .................... | 429/163 |
| 2009/0325067 A1 | 12/2009 | Liao et al. | |

FOREIGN PATENT DOCUMENTS

TW     I288495 B     10/2007

OTHER PUBLICATIONS

Dryhurst, Glenn, "Electrochemistry of Biological Molecules" Elsevier, Inc. (1977), pp. 408-415.*

* cited by examiner

*Primary Examiner* — Zachary Best
(74) *Attorney, Agent, or Firm* — Novak Druce Connolly Bove + Quigg LLP

(57) ABSTRACT

An exemplary battery is provided in the present invention. The battery comprises a carbon rod, a positive-electrode structure, a separation structure, a negative-electrode structure and a housing. The positive-electrode structure, the separation structure, the negative-electrode structure and the housing encircle the carbon rod in sequence. At least one of the positive-electrode structure and the negative-electrode structure contains chlorophyll. The battery of the present invention stores hydrogen by the chlorophyll to generate electricity. Thus, not only is the manufacturing process of the battery simple, and economical, but also natural, non-toxic substances are employed, unlike the conventional batteries, the battery of the present invention will not cause environmental pollution even when discarding after being used.

20 Claims, 3 Drawing Sheets

BATTERY WITH CHLOROPHYLL ELECTRODE

CROSS-REFERENCE TO RELATED APPLICATION

This application claims priority of Chinese Patent Application No. 201010585553.X, filed on Dec. 13, 2010, entitled "Battery" by Chungpin Liao, the disclosure of which is incorporated herein by reference in its entirety.

FIELD OF THE INVENTION

The present invention relates to a battery, and more particularly to a battery using chlorophyll to generate electricity and a manufacturing method thereof.

BACKGROUND OF THE INVENTION

In recent years, portable electronic devices, such as mobile phones, portable cameras, notebook computers, digital cameras, personal digital assistants (PDAs), CD players, are becoming popular owing to their lightweight and small size. Batteries used as a portable power source have also become the focus of the public concern, and have been an essential element of the various portable electronic devices.

However, although the common batteries, such as carbon-zinc batteries, alkaline batteries and secondary batteries, are allegedly environment-benign, they in fact largely contain substantial amounts of mercury and other heavy metals, such as cobalt. Other than that, environmental pollutants are frequently used or released during the battery manufacturing process.

Lithium batteries, though widely adopted as the largest energy content among the portable batteries, are unstable in the electrochemical reactions. In the worst case, explosions occur due to thermal runaway as the result of operating at low load or under improper assemblage. Therefore, multiple and complex protection mechanisms should be implemented for their usage, such as the installation of a protection circuit, an exhaust vent, and isolation membranes, etc.

The price of the lithium batteries rises rapidly as a result of the depletion of lithium mineral, which is the main raw material of the positive electrode (such as $Li_{1-x}CoO_2$) and the negative electrode (such as $Li_xC$) of lithium batteries. Furthermore, the performance and operating life of the lithium batteries decrease rapidly within a high temperature environment.

Therefore, an unaddressed need for a battery using chlorophyll to generate electricity exists in the art to address the aforementioned deficiencies and inadequacies.

SUMMARY OF THE INVENTION

The present invention provides a battery using chlorophyll to generate electricity that can avoid problems encountered with conventional batteries. The advantages of the present invention will be understood more readily after a consideration of the drawings and the detailed description of the preferred embodiments.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Reference will now be made to the drawings to describe an exemplary embodiment in detail.

Figure 1:
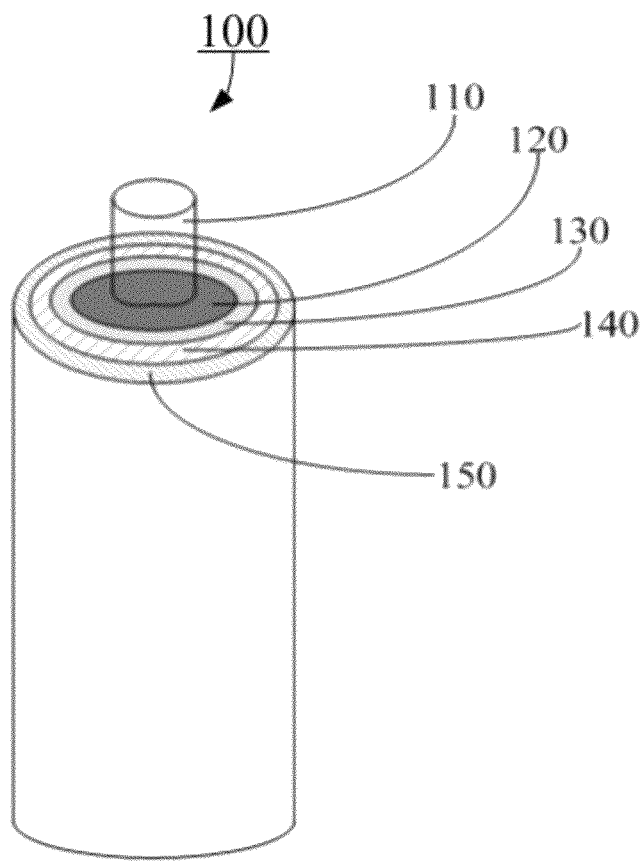
FIG. 1 is a perspective view of a battery according to an exemplary embodiment of the present invention.

FIG. 1 is a perspective view of a battery according to an exemplary embodiment of the present invention. As shown in FIG. 1, a battery 100 includes: (1) a carbon rod 110, (2) a positive-electrode structure 120, (3) a separation structure 130, (4) a negative-electrode structure 140, and (5) a housing 150. The positive-electrode structure 120, the separation structure 130, the negative-electrode structure 140 and the housing 150 encircle the carbon rod 110 in sequence.

Figure 2:
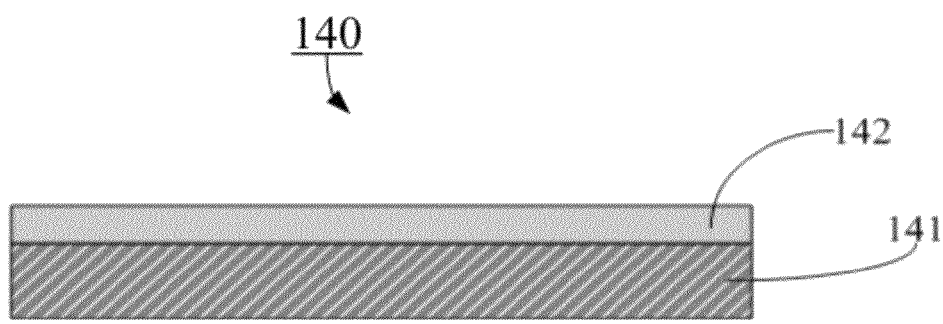
FIG. 2 is a sectional view of a negative-electrode structure as shown in FIG. 1.

FIG. 2 is a sectional view of the negative-electrode structure 140 as shown in FIG. 1. In FIG. 2, the negative-electrode structure 140 of the exemplary embodiment has a conductive layer 141 and a negative-electrode layer 142, and the negative-electrode layer 142 is formed on the conductive layer 141.

The conductive layer 141 is made of conductive material. The conductive material includes metal, metallic compound, or conductive polymeric material. The metal is selected from the group consisting of aluminum and gold. The metallic compound is selected from the group consisting of manganese protoxide, zinc oxide and magnesium oxide. Heterocycle or aromatic heterocyclic compound can be used as the conductive polymeric material. Preferably, the conductive polymeric material is selected from the group consisting of polyacetylene, poly (arylene vinylene), polythiophene, polyaniline, polypyrrole and the derivatives thereof. In addition, the area of the conductive layer 141 can be 5 cm×5 cm.

The negative-electrode layer 142 is made of negative-electrode material mainly comprising chlorophyll. Specifically, the negative-electrode layer 142 can be made by mixing the chlorophyll and high polymer solution according to a ratio of 1:1, then blending them with a magnet blender at a rate of 60 r/min (revolutions/minute) for about 1 hour, and further coating them on the conductive layer 141. The coating thickness is about 0.5 mm. Finally, the above structure is placed in an oven with a temperature of 100 degree Celsius for about 6 minutes such that the negative-electrode layer 142 is formed on the conductive layer 141.

The chlorophyll can be selected from the group consisting of chlorophyll a, chlorophyll b, chlorophyll c1, chlorophyll c2, chlorophyll d, and chlorophyll e. Typically, the chlorophyll, from which the chlorophyll oxidase may have been removed, can be in powder form or in liquid form.

The high polymer solution is adhesive and configured for adhering and adjusting the physical and chemical characters of the conductive layer 141, such that the negative-electrode layer 142 can properly adhere to the conductive layer 141. In addition, the electric conductivity of the high polymer solution is within a range of about 50 ms/cm to about 250 ms/cm. The high polymer solution contains elements selected from the group consisting of boron, magnesium, aluminum, calcium, manganese and zinc. The high polymer solution is further configured for adjusting the work function of the conductive layer 141, so as to achieve the desired potential difference, such as 1.5V, between the positive-electrode structure and the negative-electrode structure of the battery.

The high polymer solution is prepared from compound of metal ions and acid ions, high polymer and solvent in proportion, and each thereof is with a concentration from about 0.1 mol/L to about 10 mol/L. The high polymer comprises the high polymer of glucose. The high polymer of glucose can be plant starch, such as potato starch, water chestnut starch, corn starch, sweet potato starch, lotus root starch, mustard powder, and pueraria powder, etc. The compound of metal ions and acid ions can be calcium carbonate. Alternatively, the compound of metal ions and acid ions can be natural phytochemicals, including lignans, oligosaccharides, polysaccharides, flavonoids, iridoids, fatty acids, scopoletin, catechin, beta-sitosterol, damnacanthal, and alkaloids. The solvent can have a polarity and with a PH value greater than 3, such as water, seawater, tea, coffee, fruit juice or liquor, etc. The PH value of the high polymer solution is between about 5.5 to about 8. The high polymer solution can further include vitamin, such as vitamin D.

The negative-electrode structure 140 can be made into a membrane to increase the amount of the chlorophyll and enlarge the contact area thereof so as to increase the reaction area of the battery, etc. In addition, it should be understood for a person skilled in the art that, any known method can be used to increase the amount of the chlorophyll and enlarge the contact area thereof to increase the reaction area of the battery, etc.

Figure 3:
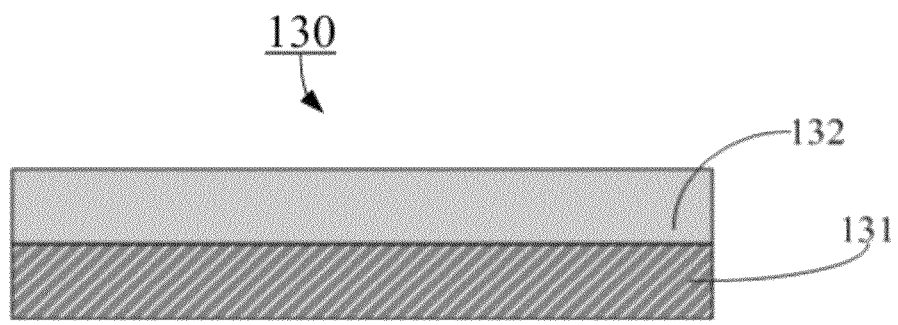
FIG. 3 is a sectional view of a separation structure as shown in FIG. 1.

FIG. 3 is a sectional view of the separation structure as shown in FIG. 1. As shown in FIG. 3, the separation structure 130 has a first separator 131 and a second separator 132. The second separator 132 is formed on the first separator 131. The first separator 131 and the second separator 132 are both made of high-fiber material, and the high-fiber material can be paper material, such as cellophane, cotton paper, rice paper or silk paper, etc. Furthermore, the high-fiber material has pores, and the diametric length of each is preferably about 0.01 μm to about 1 cm. Preferably, the first separator 131 and the second separator 132 are both membranes, and the area of each is 5 cm×5 cm.

In addition, the first separator 131 can be saturated with a solution of organic salt. The electric conductivity of the solution of organic salt can be about 10 ms/cm to about 500 ms/cm. The second separator 132 can be saturated with a solution of organic salt and chlorophyll. The organic salt can be organic salt without lithium, and selected from the group consisting of sodium iodide, sodium chloride and sodium hydroxide.

Figure 4:
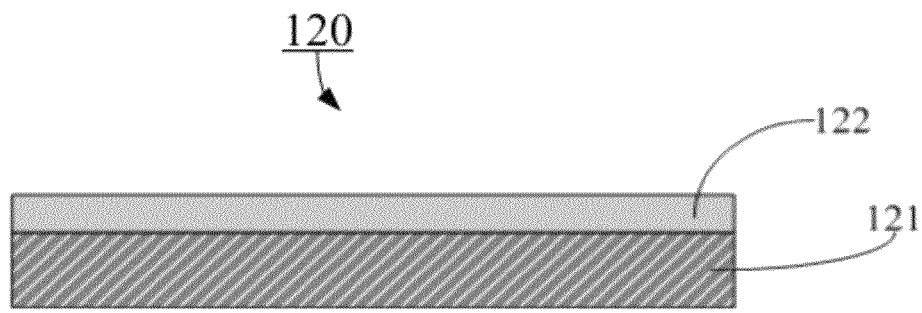
FIG. 4 is a sectional view of a positive-electrode structure as shown in FIG. 1.

FIG. 4 is a sectional view of the positive-electrode structure as shown in FIG. 1. In FIG. 4, the positive-electrode structure 120 has a conductive polymeric film 121 and a conductive nano polymeric powder film 122. The conductive nano polymeric powder film 122 is formed on the conductive polymeric film 121. The conductive polymeric film 121 and the conductive nano polymeric powder film 122 are both made of conductive polymeric material. The conductive polymeric material can be heterocycle or aromatic heterocyclic compound. Preferably, the conductive polymeric material is selected from the group consisting of polyacetylene, poly (arylene vinylene), polythiophene, polyaniline, polypyrrole and the derivatives thereof. In addition, the area of the conductive polymeric film 121 is about 5 cm by about 10 cm, and has holes with the diameter of the each hole being within a range of about 3 A to about 1000 A.

The conductive nano polymeric powder film 122 has chlorophyll powder and conductive nano polymeric powder formed by spraying the chlorophyll powder and the conductive nano polymeric powder on the conductive polymeric film 121. The total weight of the chlorophyll powder and the conductive nano polymeric powder is about 0.1 gram.

The housing 150 can be a paper tube, and configured for containing the carbon rod 110, the positive-electrode structure 120, the separation structure 130 and the negative-electrode structure 140.

In one embodiment, both the negative-electrode structure 140 and the positive-electrode structure 120 have chlorophyll. When the battery 100 operates, the chlorophyll of the negative-electrode structure 140 and the chlorophyll of the positive-electrode structure 120 generate electrons or holes as they receive light or touch the electrolyte solution, such that a potential difference occurs between the positive-electrode structure 120 and the negative-electrode structure 140 of the battery 100 to supply a continuous current. In other words, the battery 100 of the present invention uses the chlorophyll of the negative-electrode structure 140 and the chlorophyll of the positive-electrode structure 120 as the energy source to supply electricity. Preferably, the chlorophyll of the negative-electrode structure 140 and the chlorophyll of the positive-electrode structure 120 have different work functions with each other.

Although both of the negative-electrode structure 140 and the positive-electrode structure 120 comprise the chlorophyll in the exemplary embodiment, it should be understood for a person skilled in the art that, the battery of the present invention can only employ the chlorophyll in the negative-electrode structure 140, or only employ the chlorophyll in the positive-electrode structure 120, to use the chlorophyll as the energy source such that the battery can provide the electricity.

Figure 5:
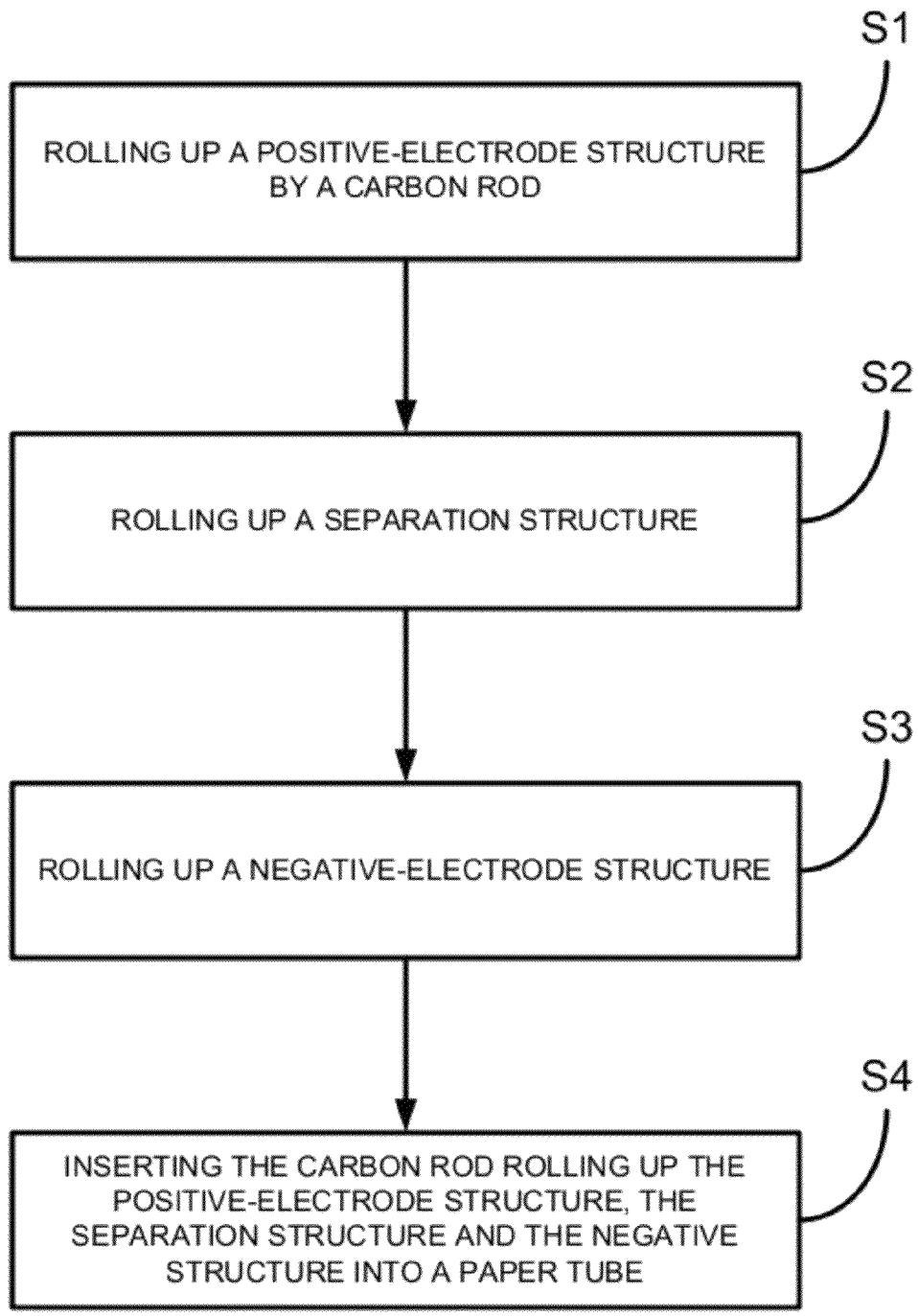
FIG. 5 is a flow chart of a manufacturing method of a battery according to an exemplary embodiment of the present invention.

FIG. 5 is a flow chart of a manufacturing method for battery in accordance with an exemplary embodiment of the present invention. As shown in FIG. 5, the manufacturing method thereof includes the following steps:

Step S1: rolling up a positive-electrode structure by a carbon rod;

Step S2: rolling up a separation structure;

Step S3: rolling up a negative-electrode structure; and

Step S4: inserting the carbon rod with the positive-electrode structure, the separation structure and the negative-electrode structure into a paper tube such that the battery is built.

The battery of the present invention stores hydrogen by the chlorophyll of the positive-electrode structure and/or the negative-electrode structure to generate electricity. Preferably, both the positive-electrode structure and the negative-electrode structure have chlorophyll, but each of these structures have different work-functions. Specifically, during the oxidation-reduction chemical reaction, the chlorophyll molecule would lose a magnesium ion in its porphyrin center to become a pheophytin molecule. Two empty bonding sites of the latter then trap two hydrogen ions to practically store hydrogen and make the running of current smooth. In addition, not only is the manufacturing process of the battery simple, and economical, but also natural, non-toxic substances are employed, unlike conventional batteries, the battery of the present invention will not cause the environmental pollution even when discarding after being used.

It should be noted that the terms "first", "second", "third" and other terms in the present invention are only used as textual symbols as the circumstances may require, and thus the practice is not limited to these terms. It should be further noted that these terms can be used interchangeably.

While there has been shown several and alternate embodiments of the present invention, it is to be understood that certain changes can be made as would be known to one skilled in the art without departing from the underlying scope of the present invention as is discussed and set forth above and below including claims. Furthermore, the embodiments described above and claims set forth below are only intended to illustrate the principles of the present invention and are not intended to limit the scope of the present invention to the disclosed elements.

What is claimed is:

1. A battery, comprising:
   a. a carbon rod;
   b. a positive-electrode structure, substantially encircling the carbon rod;
   c. a separation structure, substantially encircling the positive-electrode structure, wherein the separation structure comprises a solvent;
   d. a negative-electrode structure, substantially encircling the separation structure; and
   e. a housing, containing the carbon rod, the positive-electrode structure, the separation structure and the negative-electrode structure;
   wherein both the positive-electrode structure and the negative-electrode structure comprise chlorophyll.

2. The battery of claim 1, wherein the negative-electrode structure comprises a conductive layer and a negative-electrode layer, and the negative-electrode layer is formed on the conductive layer.

3. The battery of claim 2, wherein the conductive layer is made of conductive material, and the conductive material is selected from the group consisting of metal, metallic compound and conductive polymeric material.

4. The battery of claim 3, wherein the metal is selected from the group consisting of aluminum and gold, the metallic compound is selected from the group consisting of manganese protoxide, zinc oxide and magnesium oxide, and the conductive polymeric material is heterocycle or aromatic heterocyclic compound and selected from the group consisting of polyacetylene, poly (arylene vinylene), polythiophene, polyaniline, polypyrrole and their derivatives.

5. The battery of claim 2, wherein the negative-electrode layer comprises the chlorophyll and a polymer solution.

6. The battery of claim 5, wherein the chlorophyll is selected from the group consisting of chlorophyll a, chlorophyll b, chlorophyll c1, chlorophyll c2, chlorophyll d, and chlorophyll e.

7. The battery of claim 5, wherein the chlorophyll is in powder form or in liquid form.

8. The battery of claim 5, wherein a chlorophyll oxidase has been removed from the chlorophyll.

9. The battery of claim 5, wherein the polymer solution comprises compound of metal ions and acid ions, polymer and solvent, and each of the metal ions and the acid ions, the polymer and the solvent has a concentration of about 0.1 mol/L to about 10 mol/L.

10. The battery of claim 9, wherein the polymer is polymer of glucose, selected from the group consisting of potato starch, water chestnut starch, corn starch, sweet potato starch, lotus root starch, mustard powder and pueraria powder.

11. The battery of claim 9, wherein the compound of metal ions and acid ions is calcium carbonate or natural phytochemicals selected from the group consisting of lignans, oligosaccharides, polysaccharides, flavonoids, iridoids, fatty acids, scopoletin, catechin, beta-sitosterol, damnacanthal and alkaloids.

12. The battery of claim 9, wherein the solvent comprises water, and has a polarity and a PH value greater than 3.

13. The battery of claim 5, wherein a PH value of the polymer solution is within a range of about 5.5 to about 8, and its electric conductivity thereof is within a range of about 50 ms/cm to about 250 ms/cm.

14. The battery of claim 1, wherein the separation structure comprises a first separator and a second separator, and the second separator is formed on the first separator.

15. The battery of claim 14, wherein the first separator and the second separator are made of fiber material, and the fiber material is paper material selected from the group consisting of cellophane, cotton paper, rice paper and silk paper.

16. The battery of claim 15, wherein the first separator is saturated with a solution of organic salt, and the second separator is saturated with a solution of organic salt and chlorophyll, and the electric conductivity of the solution of organic salt is within a range of about 10 ms/cm to about 500 ms/cm.

17. The battery of claim 16, wherein the organic salt is organic salt without lithium, and selected from the group consisting of sodium iodide, sodium chloride and sodium hydroxide.

18. The battery of claim 1, wherein the positive-electrode structure comprises a conductive polymeric film and a conductive nano polymeric powder film, and the conductive nano polymeric powder film is formed on the conductive polymeric film.

19. The battery of claim 18, wherein the conductive nano polymeric powder film comprises chlorophyll powder and conductive nano polymeric powder.

20. The battery of claim 1, wherein the housing is a paper tube.

* * * * *